United States Patent
Moriyama et al.

(10) Patent No.: US 7,815,159 B2
(45) Date of Patent: Oct. 19, 2010

(54) VEHICLE SEAT SLIDING APPARATUS

(75) Inventors: Genta Moriyama, Anjo (JP); Yasuhiro Kojima, West Bloomfield, MI (US); Hideo Nihonmatsu, Anjo (JP); Yoshihisa Hori, Kakamigahara (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/569,358

(22) Filed: Sep. 29, 2009

(65) Prior Publication Data

US 2010/0090084 A1    Apr. 15, 2010

(30) Foreign Application Priority Data

Oct. 9, 2008    (JP)    ............................. 2008-263016

(51) Int. Cl.
 *F16M 13/00*    (2006.01)
(52) U.S. Cl. ..................................... 248/430
(58) Field of Classification Search ................ 248/424, 248/429, 430
 See application file for complete search history.

(56) References Cited

U.S. PATENT DOCUMENTS 5,209,447 A * 5/1993 Yokota ....................... 248/429
5,765,798 A * 6/1998 Isomura ...................... 248/430
6,176,460 B1 * 1/2001 Kojima et al. ................ 248/429
2005/0145768 A1 * 7/2005 Rohee et al. ................. 248/430
2007/0114355 A1 * 5/2007 Koumura ..................... 248/429
2007/0176072 A1 * 8/2007 Ikegaya et al. .............. 248/429
2009/0218843 A1 * 9/2009 Wojatzki et al. .......... 296/65.13

FOREIGN PATENT DOCUMENTS

JP    2005-8065    1/2005
JP    2006-298104    11/2006

\* cited by examiner

*Primary Examiner*—Ramon O Ramirez
(74) *Attorney, Agent, or Firm*—Oblon, Spivak, McClelland, Maier & Neustadt, L.L.P.

(57) ABSTRACT

A vehicle seat sliding apparatus includes a first rail adapted to be fixed to any one of a vehicle floor and a seat; and a second rail adapted to be fixed to the other one of the vehicle floor and the seat. The second rail includes an in-rail functional portion formed at an end portion of the first rail in terms of the longitudinal direction so as to project into an internal space formed by the first rail to achieve a predetermined function; a recessed portion formed around the in-rail functional portion in association with the formation of the in-rail functional portion; and a protector adapted to be mounted on an end portion of the first rail in terms of the longitudinal direction and cover the end portion thereof. The protector is formed with a projection adapted to fit the recessed portion to couple the protector and the first rail.

12 Claims, 3 Drawing Sheets

VEHICLE SEAT SLIDING APPARATUS

CROSS REFERENCE TO RELATED APPLICATION

This application is based on and claims priority under 35 U.S.C. Section 119 to Japanese Patent Application No. 2008-263016 filed on Oct. 9, 2008, the entire content of which is incorporated herein by reference.

BACKGROUND OF THE INVENTION

1. Field of the Invention

The present invention relates to a vehicle seat sliding apparatus.

2. Description of the Related Art

In the related art, various types of vehicle seat sliding apparatuses are proposed (for example, JP-A-2005-8065, JP-A-2006-298104). These apparatuses each include a lower rail and an upper rail connected to the lower rail so as to be movable with respect to the lower rail. The vehicle seat sliding apparatus described, for example, in JP-A-2005-8065 includes a leg bracket attached to a lower surface of the rear portion of the lower rail with a screw and a leg cover fixed to a peripheral edge portion of the leg bracket. Therefore, the rear end portion of the lower rail is covered with the leg bracket and the leg cover (hereinafter, referred to also as "protector" for convenience).

In the vehicle seat sliding apparatus disclosed in JP-A-2005-8065, the rear end portion of the lower rail is covered with two components (the leg bracket and the leg cover) and a process to tighten the leg bracket is required, so that increase in number of components and in number of manufacturing steps is inevitable. Therefore, mounting a single piece of protector on the rear end portion of the lower rail and covering the same is studied by the present applicant. In this case, since the protector is supposed to come off easily if it is simply mounted on the rear end portion of the lower rail, it is preferable to provide an adequate locking device between the lower rail and the protector. For example, a locking hole is formed on the lower rail and a locking claw which can be fitted into the locking hole is formed on the protector. Accordingly, by fitting the locking claw in the locking hole when mounting the protector on the rear end portion of the lower rail, the protector can be prevented from coming apart.

However, since a process work to form the locking hole specific for preventing the protector from coming apart at least on the lower rail is necessary, increase in number of steps in the process work is inevitable correspondingly.

SUMMARY OF THE INVENTION

Thus, a need exists for a vehicle seat sliding apparatus which is not susceptible to the drawback mentioned above.

In order to solve the drawback mentioned above, a first aspect of the invention provides a vehicle seat sliding apparatus including: a first rail adapted to be fixed to any one of a vehicle floor and a seat; a second rail adapted to be fixed to the other one of the vehicle floor and the seat and adapted to be connected to the first rail so as to be capable of relative movement with respect to the first rail, the first rail including: a pair of side wall portions juxtaposed on both sides in terms of the widthwise direction; a connecting wall portion connecting proximal ends of the both side wall portions; and first folded-back wall portions protruded from distal ends of the both side wall portions in the widthwise direction and then folded back toward proximal end sides of the side wall portions, the second rail including: a pair of second folded-back wall portions protruded from both sides in the widthwise direction and then folded back so as to be surrounded by the side wall portions and the first folded-back wall portions, an in-rail functional portion formed at an end portion of the first rail in terms of the longitudinal direction so as to project into an internal space formed by the first rail to achieve a predetermined function; a recessed portion formed around the in-rail functional portion in association with the formation of the in-rail functional portion; and a protector adapted to be mounted on an end portion of the first rail in terms of the longitudinal direction and cover the end portion thereof, in which the protector is formed with a projection adapted to fit the recessed portion to couple the protector and the first rail.

DESCRIPTION OF THE PREFERRED EMBODIMENTS

Figure 1:
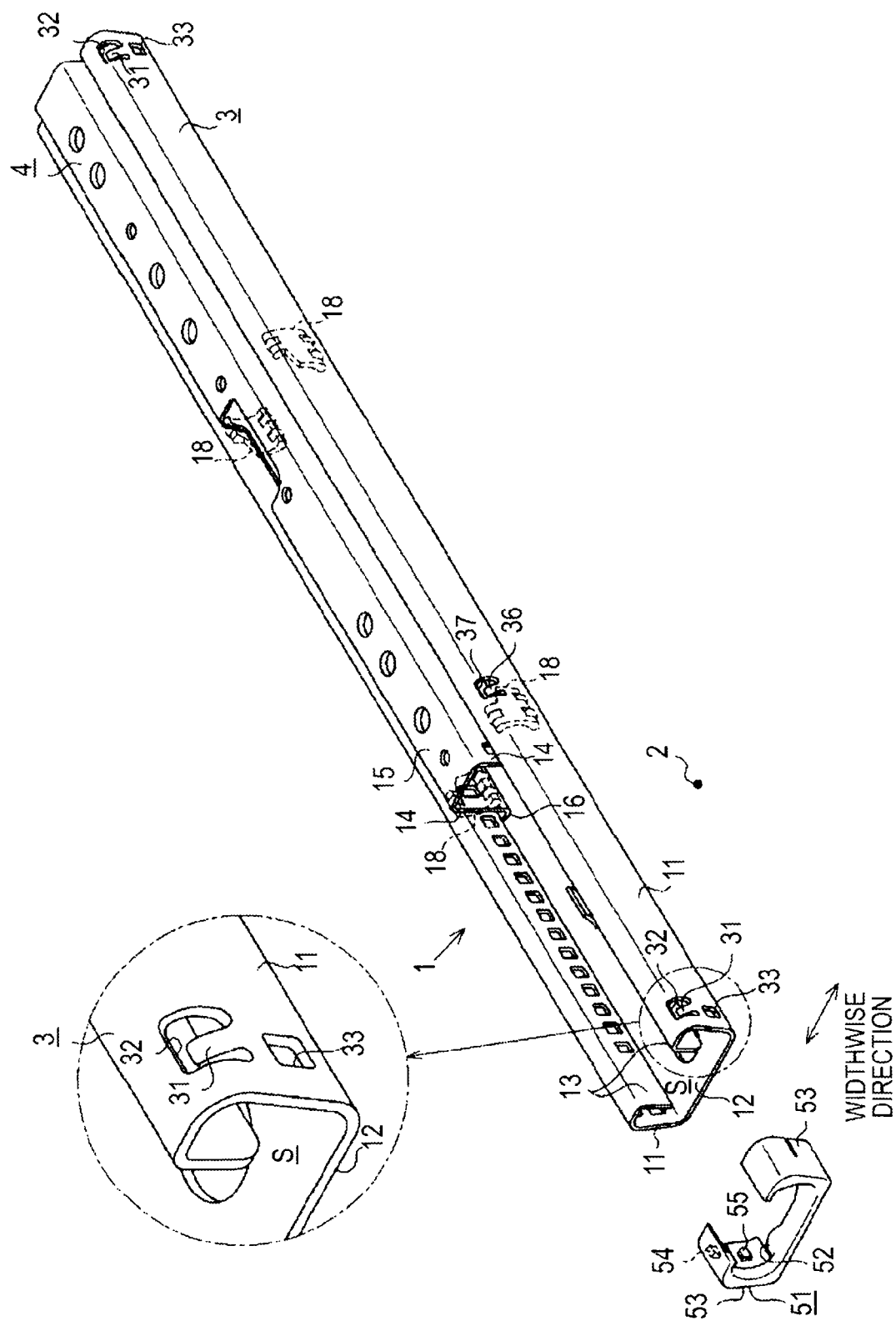
FIG. 1 is a perspective view showing an embodiment of the invention and an enlarged view thereof.

Referring now to the drawings, an embodiment in which the invention is embodied will be described below.

Figure 2:
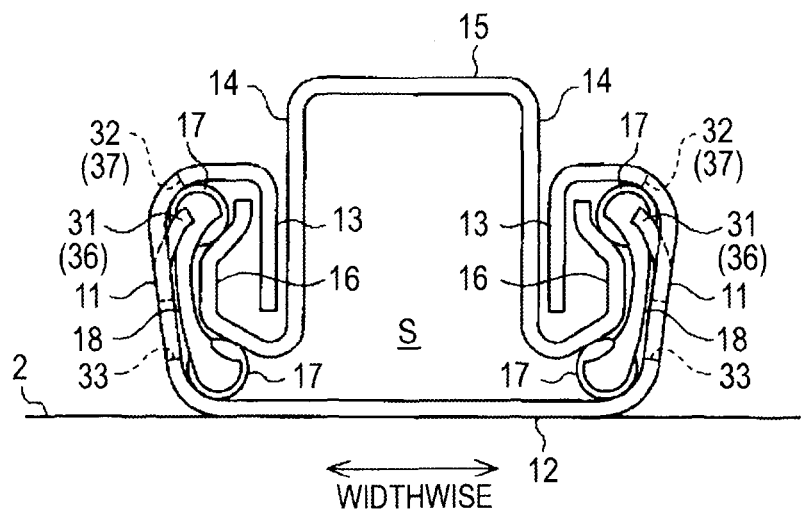
FIG. 2 is a front view showing the same embodiment.

FIG. 1 and FIG. 2 are a perspective view and a front view showing a vehicle seat sliding apparatus 1 according to an embodiment which is mounted on a vehicle such as an automotive vehicle. As illustrated in these drawings, a lower rail 3 as a first rail is fixed to a vehicle floor 2 in a state of extending in the fore-and-aft direction of the vehicle, and an upper rail 4 as a second rail is mounted on the lower rail 3 so as to be movable relatively to the lower rail 3.

The lower rail 3 and the upper rail 4 are disposed in pairs respectively in the widthwise direction of a vehicle seat. Then, a seat which forms a seating portion for an occupant is fixed to and supported by the both upper rails 4. The relative movement of the lower rail 3 and the upper rail 4 is normally restricted by a locking member (not shown), and the restriction is released by applying an operating force to the locking member.

The lower rail 3 includes a pair of side wall portions 11 extending upright from both sides thereof in terms of the widthwise direction and a bottom wall portion 12 as a connecting wall portion which connects proximal ends (lower ends) of the each side wall portion 11. Then, folded-back wall portions 13 as first folded-back wall portions which are formed to protrude inward in terms of the widthwise direction and then folded backward toward the proximal end sides of the side wall portions 11 are formed continuously from distal ends (upper ends) of the respective side wall portions 11. The lower rail 3 defines an internal space S opening upward (see FIG. 2).

In contrast, the upper rail 4 includes a pair of side wall portions 14 extending in the vertical direction between the both folded-back wall portions 13 of the lower rail 3 and a lid wall portion 15 connecting proximal ends (upper ends) of the side wall portions 14. Then, folded-back wall portions 16 as second folded-back wall portions which are formed to protrude outward in terms of the widthwise direction and then folded so as to be surrounded by the side wall portions 11 and the folded-back wall portions 13 are formed continuously from distal ends (lower ends) of the respective side wall portions 14.

In other words, the lower rail 3 and the upper rail 4 each include a U-shaped rail cross section with opening sides butted against to each other, and are prevented from coming apart from each other in the longitudinal direction mainly by the engagement of the folded-back wall portions 13 and 16. The rail cross section formed by the lower rail 3 and the upper rail 4 assumes so-called a box shape in a rectangular shape.

Mounted between the respective folded-back wall portions 16 and the side wall portions 11 opposed thereto are retainers 18 each for holding a pair of rolling elements 17 formed of a spherical member and arranged in the vertical direction. The each respective rolling element 17 is interposed between the upper end and the lower end of the side wall portion 11 in a state of being abutted against the folded-back wall portion 16. The retainers 18 on the respective sides in terms of the widthwise direction are arranged in pair apart from each other on one side and the other side (the lower left side and the upper right side in FIG. 1) with the intermediary of a center portion of the lower rail 3 in terms of the longitudinal direction. The retainers 18 are arranged symmetrically in terms of the widthwise direction. The upper rail 4 is supported so as to be slidable in the longitudinal direction (the fore-and-aft direction of the vehicle) with respect to the lower rail 3 in a state of rolling the rolling elements 17 with respect to the lower rail 3.

The each side wall portion 11 is formed with a stopper 31 as in-rail functional portions which project into the internal space S to achieve a predetermined function at both end portions thereof in terms of the longitudinal direction. As shown in FIG. 2, the stoppers 31 disposed on the both side wall portions 11 are arranged symmetrically in terms of the widthwise direction. The each stopper 31 is cut and raised so that an upper end projects into the internal space S about a lower end as a starting point at an upper side portion of the side wall portion 11 (that is, a portion on the side of the opening of the lower rail 3) and is formed so as to block the path of movement of the each retainer 18 in the longitudinal direction (direction orthogonal to the paper plane) of the lower rail 3 or the like. Accordingly, the each stopper 31 functions as a member to prevent the retainer 18 (the rolling element 17) from coming apart in the longitudinal direction of the lower rail 3 or the like.

As illustrated in FIG. 1 in an enlarged scale, a locking hole 32 as a recessed portion is formed around the each stopper 31 in association with the formation (cut and raise) of the stopper 31. The each locking hole 32 has a U-shape opened downward according to an outline of the stopper 31. The each side wall portion 11 opens in the rail width direction via the locking hole 32, and in appearance, is formed to be depressed inward in the rail width direction by the stopper 31.

In addition, a stopper 36 and a through hole 37, which are similar to the stopper 31 and the locking hole 32 are formed at an intermediate portion of the each side wall portion 11 in terms of the longitudinal direction. The each stopper 36 also functions as a member to prevent the retainer 18 (the rolling element 17) from coming apart in the longitudinal direction of the lower rail 3 or the like. The stoppers 31 and 36 which prevent the retainer 18 from coming apart are formed by mounting the retainer 18 between the lower rail 3 and the upper rail 4 and then applying a bending process in a state in which the locking hole 32 and the through hole 37 are formed on the lower rail 3 in advance. Therefore, the stoppers 31 and 36 do not interfere with the retainer 18 when it is mounted. The each side wall portion 11 is formed with a lock hole 33 which opens in the rail width direction on the lower side of the stopper 31 (the locking hole 32).

Figure 3:
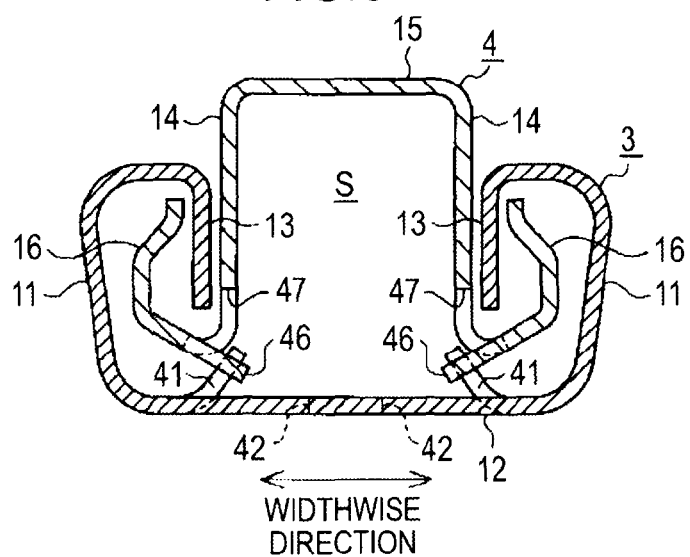
FIG. 3 is a cross-sectional view showing the same embodiment.

As shown in FIG. 3, the lower rail 3 is formed with a pair of cut-and-raised strips 41 arranged on the bottom wall portion 12 symmetrically in terms of the widthwise direction at a center portion in terms of the longitudinal direction of the lower rail 3. The pair of the cut-and-raised strips 41 are cut and raised at a predetermined angle so as to assume the shape of slanting eyebrows reducing the distance toward the upper ends thereof, and project into the internal space S. Also, the respective cut-and-raised strips 41 extend in the longitudinal direction of the lower rail 3, that is, in the direction of the relative movement of the lower rail 3 and the upper rail 4. Then, incised portions 42 are formed in association with the formation of the cut-and-raised strips 41 (cut and raised portions) around the respective cut-and-raised strips 41.

In contrast, at both end portions of the upper rail 4 in terms of the longitudinal direction, a pair of cut-and-raised strips 46 arranged symmetrically in the widthwise direction are formed at the connecting portion between the side wall portions 14 and the folded-back wall portions 16. The pair of the cut-and-raised strips 46 are cut and raised at a predetermined angle so as to assume the shape of slanting eyebrows reducing the distance toward the lower ends thereof, and project into the internal space S. Also, the respective cut-and-raised strips 46 extend in the direction of the relative movement of the lower rail 3 and the upper rail 4. Then, incised portions 47 are formed in association with the formation of the cut-and-raised strips 46 (cut and raised portions) around the respective cut-and-raised strips 46.

Also, the both cut-and-raised strips 41 and 46 are arranged so that the respective opposed surfaces are able to come into abutment with each other in the direction of the relative movement of the lower rail 3 and the upper rail 4. Therefore, the both cut-and-raised strips 41 and 46, being engaged with each other in association with the relative movement of the lower rail 3 and the upper rail 4, restrict the range which allows the relative movement of the lower rail 3 and the upper rail 4.

As shown in FIG. 1, the lower rail 3 is provided with a resin-made protector 51 which covers an end thereof in terms of the longitudinal direction mounted thereon. The protector 51 includes a portion-to-be-mounted-on-the-bottom-wall 52 as a connecting wall fitting portion which is mounted on the bottom wall portion 12 in a state of being abutted against a distal end surface of the bottom wall portion 12 in terms of the longitudinal direction, and a pair of portions-to-be-mounted-on-the-side-walls 53 which extend upright from both ends of the portion-to-be-mounted-on-the-bottom-wall 52 in terms of the widthwise direction and are mounted on the both side wall portions 11 and the folded-back wall portion 13 respectively in a state of being abutted against a distal end surfaces of the pair of side wall portions 11 in terms of the longitudinal direction and the distal end surfaces of the proximal end portions of the folded-back wall portions 13.

Figure 4:
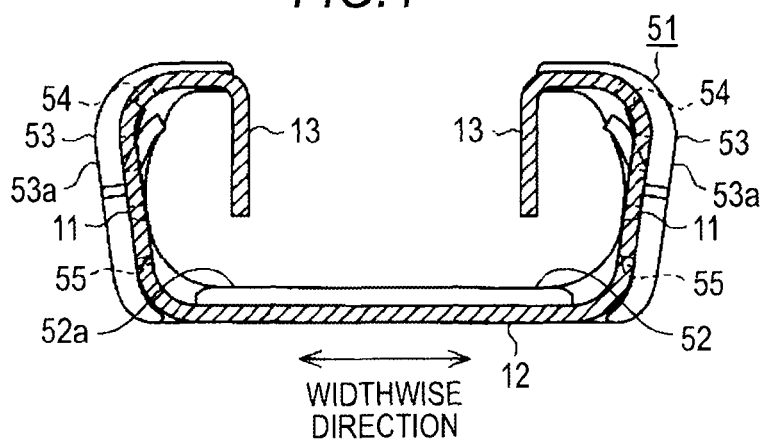
FIG. 4 is a cross-sectional view showing the same embodiment.

Then, as shown by a back view of the protector 51 viewed toward the distal end of the lower rail 3 in terms of the longitudinal direction in FIG. 4, the portion-to-be-mounted-on-the-bottom-wall 52 includes an upper extending strip 52a which is brought into a press contact with the upper surface of the bottom wall portion 12 at the center portion in terms of the widthwise direction. In contrast, the respective portions-to-be-mounted-on-the-side-walls 53 have side extending strips 53a which come into a press contact with the outer side surfaces of the proximal end portions of the side wall portions 11 and the folded-back wall portions 13, and each include a projection 54 and a locking claw 55 projecting from the side extending strip 53a inward in terms of the widthwise direction so as to oppose the locking hole 32 and the lock hole 33. In other words the projections 54 are provided on the side of the opening of the protector 51 at the both portions-to-be-mounted-on-the-side-walls 53 (side extending strips 53a). Then, the protector 51 to be mounted on the end portion of the lower rail 3 in terms of the longitudinal direction is connected to the lower rail 3 by the projections 54 and the locking claws 55 being fitted to the locking holes 32 and the lock holes 33 respectively when the lower rail 3 is being press-fitted to the upper extending strip 52a and the both side extending strips 53a.

Figure 5A:
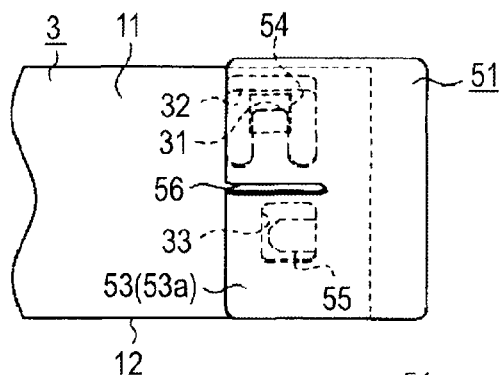
FIG. 5A is a side view showing the same embodiment.
Figure 5B:
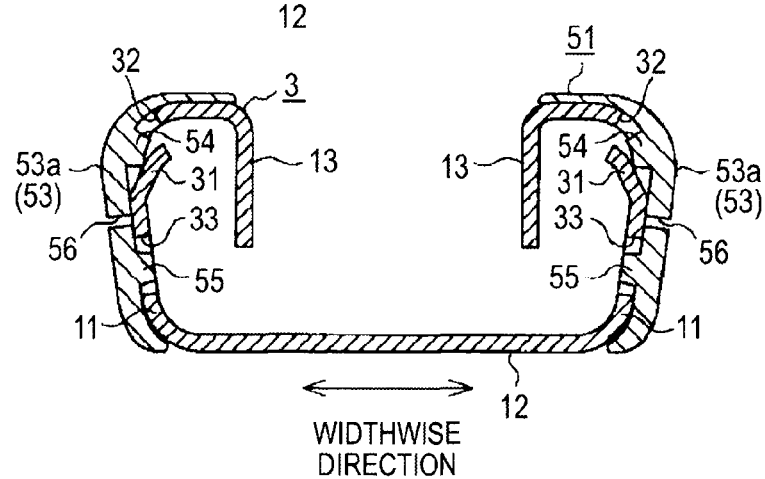
FIG. 5B is a cross-sectional view showing the same embodiment.
Figure 6A:
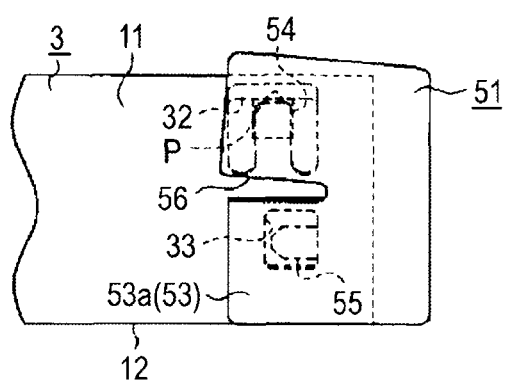
FIG. 6A is a side view showing an operation of the same embodiment.
Figure 6B:
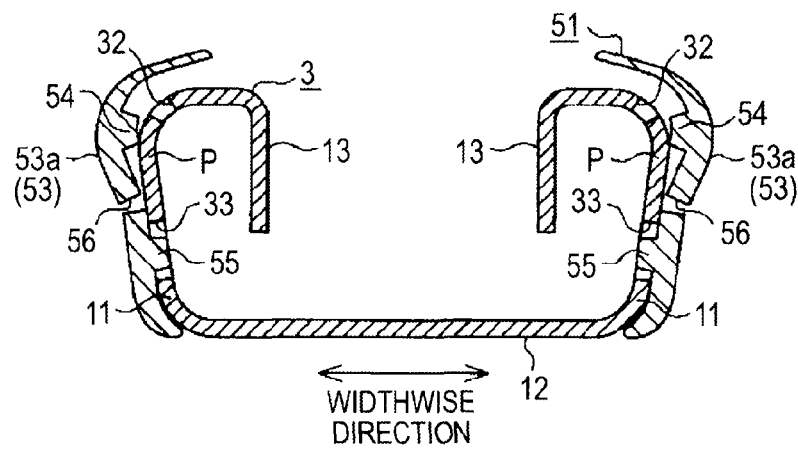
FIG. 6B is a cross-sectional view showing the operation of the same embodiment.

The projections 54 are formed partly in the proximity of or in abutment with the outer side surfaces of the stoppers 31 in association with the fitting with the locking holes 32. Also, as shown in FIGS. 5A and 5B, the side extending strips 53a each are formed with a slit 56 extending between the projection 54 and the locking claw 55 from the distal end of the lower rail 3 in terms of the longitudinal direction in the longitudinal direction. Therefore, as shown in FIGS. 6A and 6B, in a state in which the process of the stoppers 31 by cutting and raising is not performed, the projections 54 interfere with a portions P of the lower rail 3 where the stoppers 31 should exist, so that the projections 54 and the locking holes 32 cannot be fitted completely and hence the protectors 51 are deformed. In other words, the protectors 51 are resiliently deformed so that portions of the respective portions-to-be-mounted-on-the-side-walls 53 upper from the slits 56 are lifted with respect to the portions lower than the slits 56, and the opening sides of the both portions-to-be-mounted-on-the-side-walls 53 open. In this case, the slits 56 accelerate the both portions-to-be-mounted-on-the-side-walls 53 on the opening side to open. Therefore, the unprocessed state of the stoppers 31 can easily be viewed.

As described above in detail, the following advantages are achieved according to this embodiment.

(1) In this embodiment, the protector 51 to be mounted at an end portion of the lower rail 3 in terms of the longitudinal direction can be prevented from coming apart further reliably by the fitting between the locking holes 32 and the projections 54. Also, since the process for preventing the protector 51 from coming apart does not have to be performed excessively on the lower rail 3, the number of steps in process work can be reduced correspondingly.

(2) In this embodiment, the projections 54 are provided on the side of the opening of the protector 51 at the both portions-to-be-mounted-on-the-side-walls 53. Therefore, for example, when the fitting between the projections 54 and the locking holes 32 is not complete, the opening side of the both portions-to-be-mounted-on-the-side-walls 53 of the protector 51 is opened, so that it is easily recognized.

(3) In this embodiment, the both portions-to-be-mounted-on-the-side-walls 53 are formed with the slits 56 which accelerate the opening on the opening side thereof respectively. Therefore, for example, when the fitting between the projections 54 and the locking holes 32 is not complete, the opening side of the both portions-to-be-mounted-on-the-side-walls 53 is accelerated by the slits 56, so that it is recognized further easily.

(4) In this embodiment, the projections 54 are formed partly in the proximity of or in abutment with the stoppers 31 in association with the fitting with the locking holes 32. Therefore, in the unprocessed state of the stoppers 31 for example, the projections 54 interfere with the portions P of the lower rail 3 where the stoppers should exist and the protector 51 is deformed, so that the unprocessed state can be viewed. Accordingly, misremember of processing the stoppers 31 is prevented.

(5) In this embodiment, the rolling elements 17 (retainers 18) can be prevented from coming apart in terms of the longitudinal direction of the lower rail 3 by the stoppers 31.

(6) In this embodiment, the locking holes 32 and the lock hole 33 can be hidden by the protector 51 to be mounted at an end portion of the lower rail 3 in terms of the longitudinal direction, so that the appearance can be improved.

The embodiment described above may be modified as follows.

In the embodiment described above, the recessed portion (locking hole 32) formed around the stopper 31 does not have to be opened in the widthwise direction and, for example, it may be the recessed portion depressed in the widthwise direction.

In the embodiment described above, when the cut-and-raised strips 41 and the incised portions 42 for restricting the allowable range of relative movement between the lower rail 3 and the upper rail 4 are arranged at the end portion of the lower rail 3 in terms of the longitudinal direction, a protector provided with projections which are fitted to the incised portions 42 as the recessed portions formed around the cut-and-raised strips 41 as the in-rail functional portion is also applicable.

In the embodiment described above, it may be a protector mounted at the end portion of the upper rail 4 in terms of the longitudinal direction. In this case, projections which are to be fitted into the incised portions 47 as the recessed portions formed around the cut-and-raised strips 46 as the in-rail functional portions may be provided in the protector.

In the embodiment described above, the protector may be mounted at both ends of the rail in terms of the longitudinal direction or may be mounted one of the ends thereof.

In the embodiment described above, the cross-sectional shape of the lower rail 3 is shown simply as an example. For example, the folded-back wall portions 13 may be protruded outward in terms of the rail width direction.

In the embodiment described above, the cross-sectional shape of the upper rail 4 is shown simply as an example. For example, the folded-back wall portions 16 may be protruded inward in terms of the rail width direction. The cross section of the upper rail 4 is not limited to the U-shape, but may be an inverted T-shape.

In the embodiment described above, the shape or the number of the rolling elements 17 may be changed as needed. Also the rolling elements 17 may be interposed independently between the lower rail 3 and the upper rail 4 without being held by the retainers 18.

In the embodiment described above, the positional relation between the lower rail 3 and the upper rail 4 may be upside down. In other words, a configuration in which the upper rail 4 is fixed to the vehicle floor 2 and the lower rail 3 is fixed to the seat is also applicable.

In the embodiment described above, the lower rail 3 and the upper rail 4 (vehicle seat sliding apparatus) may be adapted to be disposed one each or three or more each for the seat.

The direction of movement of the seat in association with the movement of upper rail 4 with respect to the lower rail 3 may be, for example, the fore-and-aft direction or the widthwise direction of the vehicle.

Subsequently, the technical idea understood from the embodiment and other examples described above will be added below.

According to the vehicle seat sliding apparatus in the invention, the second rail includes a stopper portion, and the in-rail functional portion is a cut-and-raised strip which engages the stopper portion in association with the relative movement between the first and second rails and restricts the allowable range of the relative movement between the first and second rails. In this configuration, the allowable range of the relative movement between the first and second rails can be restricted by the cut-and-raised strip as the in-rail functional portion.

According to one embodiment of the invention, the protector to be mounted at an end portion of the first rail in terms of the longitudinal direction can be prevented from coming apart further reliably by the fitting between the recessed portions and the projections. Also, since the process for preventing the protector from coming apart does not have to be performed excessively on the first rail, the number of steps in process work can be reduced correspondingly.

According to one embodiment of the invention, for example, when the fitting between the projections and the recessed portions is not complete, the opening side of the both portions-to-be-mounted-on-the-side-walls of the protector is opened, so that it is easily recognized.

According to one embodiment of the invention, for example, when the fitting between the projections and the recessed portions is not complete, the opening on the opening side of the both portions-to-be-mounted-on-the-side-walls is accelerated by the slits, so that it is recognized further easily.

According to one embodiment of the invention, in the unprocessed state of the in-rail processing portions for example, the projections interfere with the portions of the first rail where the in-rail processing portions should exist and the protector is deformed, so that the unprocessed state can be viewed.

According to one embodiment of the invention, the rolling elements are prevented from coming apart in terms of the longitudinal direction of the first rail by the stoppers as the in-rail functional portions.

According to one embodiment of the invention, the vehicle seat sliding apparatus in which the protector adapted to cover the end of the rail is prevented from coming apart further reliably without increasing the number of steps in the process work is provided.

What is claimed is:

1. A vehicle seat sliding apparatus comprising:
a first rail adapted to be fixed to any one of a vehicle floor and a seat; and
a second rail adapted to be fixed to the other one of the vehicle floor and the seat and adapted to be connected to the first rail so as to be capable of relative movement with respect to the first rail,
the first rail including:
a pair of side wall portions juxtaposed on both sides in terms of the widthwise direction;
a connecting wall portion connecting proximal ends of the both side wall portions; and
first folded-back wall portions protruded from distal ends of the both side wall portions in the widthwise direction and then folded back toward proximal end sides of the side wall portions,
the second rail including:
a pair of second folded-back wall portions protruded from both sides in the widthwise direction and then folded back so as to be surrounded by the side wall portions and the first folded-back wall portions;
an in-rail functional portion formed at an end portion of the first rail in terms of the longitudinal direction so as to project into an internal space formed by the first rail to achieve a predetermined function;
a recessed portion formed around the in-rail functional portion in association with the formation of the in-rail functional portion; and
a protector adapted to be mounted on an end portion of the first rail in terms of the longitudinal direction and cover the end portion thereof, wherein
the protector is formed with a projection adapted to fit the recessed portion to couple the protector and the first rail.

2. The vehicle seat sliding apparatus according to claim 1, wherein the protector includes a connecting wall fitting portion adapted to be mounted to the connecting wall portion and a pair of portions-to-be-mounted-on-the-side-walls provided so as to extend upright from both ends of the connecting wall fitting portion in terms of the widthwise direction and adapted to be fitted to at least the pair of side wall portions respectively,
the in-rail functional portions are provided at portions of the both side wall portions on the side of an opening of the first rail, and
the projections are provided at portions of the both portions-to-be-mounted-on-the-side-walls on the side of the opening of the protector.

3. The vehicle seat sliding apparatus according to claim 2, wherein the projections are molded partly in the proximity of or in abutment with the in-rail functional portions in association with the fitting with the recessed portions.

4. The vehicle seat sliding apparatus according to claim 3, further comprising a rolling element adapted to be interposed between the first and second rails so as to be in abutment with one of the first and second folded-back wall portions and slidably support the second rail with respect to the first rail, wherein the in-rail functional portions are stoppers adapted to prevent the rolling elements from coming apart in terms of the longitudinal direction of the first rail.

5. The vehicle seat sliding apparatus according to claim 2, further comprising a rolling element adapted to be interposed between the first and second rails so as to be in abutment with one of the first and second folded-back wall portions and slidably support the second rail with respect to the first rail, wherein the in-rail functional portions are stoppers adapted to prevent the rolling elements from coming apart in terms of the longitudinal direction of the first rail.

6. The vehicle seat sliding apparatus according to claim 2, wherein the both portions-to-be-mounted-on-the-side-walls are formed with slits adapted to accelerate the opening on the opening side thereof.

7. The vehicle seat sliding apparatus according to claim 6, wherein the projections are molded partly in the proximity of or in abutment with the in-rail functional portions in association with the fitting with the recessed portions.

8. The vehicle seat sliding apparatus according to claim 7, further comprising a rolling element adapted to be interposed between the first and second rails so as to be in abutment with one of the first and second folded-back wall portions and slidably support the second rail with respect to the first rail, wherein the in-rail functional portions are stoppers adapted to prevent the rolling elements from coming apart in terms of the longitudinal direction of the first rail.

9. The vehicle seat sliding apparatus according to claim 6, further comprising a rolling element adapted to be interposed between the first and second rails so as to be in abutment with one of the first and second folded-back wall portions and slidably support the second rail with respect to the first rail, wherein the in-rail functional portions are stoppers adapted to prevent the rolling elements from coming apart in terms of the longitudinal direction of the first rail.

10. The vehicle seat sliding apparatus according to claim 1, wherein the projections are molded partly in the proximity of or in abutment with the in-rail functional portions in association with the fitting with the recessed portions.

11. The vehicle seat sliding apparatus according to claim 10, further comprising a rolling element adapted to be interposed between the first and second rails so as to be in abutment with one of the first and second folded-back wall portions and slidably support the second rail with respect to the first rail, wherein the in-rail functional portions are stoppers adapted to prevent the rolling elements from coming apart in terms of the longitudinal direction of the first rail.

12. The vehicle seat sliding apparatus according to claim 1, further comprising a rolling element adapted to be interposed between the first and second rails so as to be in abutment with one of the first and second folded-back wall portions and slidably support the second rail with respect to the first rail, wherein the in-rail functional portions are stoppers adapted to prevent the rolling elements from coming apart in terms of the longitudinal direction of the first rail.

* * * * *